(12) United States Patent
Hopkins, III et al.

(10) Patent No.: US 9,118,810 B1
(45) Date of Patent: *Aug. 25, 2015

(54) SYSTEMS AND METHODS FOR VIDEOPHONE IDENTITY CLOAKING

(71) Applicant: United Services Automobile Association (USAA), San Antonio, TX (US)

(72) Inventors: John C. Hopkins, III, San Antonio, TX (US); Erasmo Sanchez, Jr., Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/855,274

(22) Filed: Apr. 2, 2013

Related U.S. Application Data

(63) Continuation of application No. 12/496,735, filed on Jul. 2, 2009, now Pat. No. 8,413,218.

(51) Int. Cl.
*H04N 7/14* (2006.01)
*H04N 7/15* (2006.01)

(52) U.S. Cl.
CPC ....................... *H04N 7/157* (2013.01)

(58) Field of Classification Search
CPC .......................................................... H04N 7/14
USPC ............. 348/14.01, 14.12, 14.08; 379/265.09
See application file for complete search history.

(56) References Cited

U.S. PATENT DOCUMENTS

| | | | |
|---|---|---|---|
| 5,774,663 A * | 6/1998 | Randle et al. ................. 709/204 |
| 5,831,665 A * | 11/1998 | Dezonno .................... 348/14.11 |
| 6,400,374 B2 * | 6/2002 | Lanier ........................... 345/630 |
| 6,580,811 B2 * | 6/2003 | Maurer et al. ................ 382/103 |
| 7,227,567 B1 * | 6/2007 | Beck et al. ................. 348/14.07 |
| 7,685,237 B1 | 3/2010 | Weaver et al. |
| 7,728,866 B2 * | 6/2010 | Currivan et al. ........... 348/14.01 |
| 8,111,280 B2 * | 2/2012 | Kim ........................... 348/14.01 |
| 8,111,281 B2 * | 2/2012 | Sangberg et al. .......... 348/14.01 |
| 8,159,504 B2 * | 4/2012 | Chang et al. ................. 345/619 |
| 8,165,282 B1 * | 4/2012 | Coughlan et al. ........ 379/265.11 |
| 8,253,771 B2 * | 8/2012 | Lammers .................... 348/14.01 |
| 8,413,218 B1 | 4/2013 | Hopkins, III et al. |
| 8,421,805 B2 * | 4/2013 | Bishop ........................ 345/473 |

(Continued)

OTHER PUBLICATIONS

Gross, et al. "Model-Based Face De-Identification". Proceedings of the 2006 Conference on Computer Vision and Pattern Recognition Workshop (CVPRW'06), IEEE, 2006, 8 pgs.

(Continued)

*Primary Examiner* — Olisa Anwah
(74) *Attorney, Agent, or Firm* — Kane Kessler, P.C.; Barry E. Negrin; Paul E. Szabo

(57) ABSTRACT

A system, method, and computer-usable medium are disclosed for masking the identity of a human agent by transforming a live video transmission into a persona video transmission. A request is received from a user for a videoconference with a human agent. A persona is selected and associated with a human agent. The videoconference is then conducted, using data associated with the persona to transform the live video transmission of the human agent into a persona video transmission, which is correlated to the live video transmission.

3 Claims, 5 Drawing Sheets

(56) References Cited

U.S. PATENT DOCUMENTS

| | | |
|---|---|---|
| 2005/0002514 A1 | 1/2005 | Shafiee et al. |
| 2007/0153091 A1 | 7/2007 | Watlington et al. |
| 2007/0286520 A1* | 12/2007 | Zhang et al. ................. 382/264 |
| 2008/0037836 A1 | 2/2008 | Chen et al. |
| 2008/0240571 A1 | 10/2008 | Tian et al. |
| 2009/0017916 A1 | 1/2009 | Blanchard et al. |

OTHER PUBLICATIONS

Leung, et al. "Realisitic Video Avatar", 2000, 4 pgs.

* cited by examiner

SYSTEMS AND METHODS FOR VIDEOPHONE IDENTITY CLOAKING

CROSS-REFERENCE TO RELATED APPLICATIONS

This application is a continuation of U.S. patent application Ser. No. 12/496,735, filed on Jul. 2, 2009, now U.S. Pat. No. 8,413,218, which is herein incorporated by reference.

BACKGROUND

1. Field of the Disclosure

Embodiments of the disclosure relate in general to the field of computers and similar technologies, and in particular to software utilized in this field. Still more particularly, it provides a system, method, and computer-usable medium for masking the identity of a human agent by transforming a live video transmission into a persona video transmission.

2. Background of the Disclosure

Video-conferencing between customers and their providers, either through a computing device or a mobile phone, is gaining acceptance by consumers but is being resisted by customer service personnel. A common concern is his or her on-screen appearance due to their physical attributes. Another concern is the possibility of a stalking incident resulting from visual identification during a videoconference. Currently, telephone representatives are somewhat shielded against out-of-office confrontations by disgruntled customers as a stalker typically does not know what the phone representative looks like. Unfortunately, that is not the case with video conferencing.

Yet another concern is the possibility of discrimination claims by consumers and customer service personnel alike. As an example, a consumer may claim discrimination based on their appearance. As another example, an applicant may claim that their age, sex, race, or physical appearance is the reason for not being hired for a videoconference-based customer service position. However, these concerns are offset by the ongoing need to improve customer relationships, which are often achieved through more effective interpersonal communication and exchange of information. Current video communication approaches support such efforts by allowing individuals to view each other's facial expressions, gestures, and body language, but fail to provide anonymity.

BRIEF SUMMARY

A system, method, and computer-usable medium are disclosed for masking the identity of a human agent by transforming a live video transmission into a persona video transmission. In various embodiments, the persona video transmission is correlated, based on the data related to the persona, to the live video transmission. As an example, if a human agent raises their hand, the persona represented in the persona video transmission of the human agent likewise raises their hand. As another example, if the human agent smiles, the persona represented in the persona video transmission of the human agent likewise smiles. In these and other embodiments, the data related to a persona comprises human body, facial, language, gender, and apparel attribute data.

In these and other embodiments, a request is received from a user for a videoconference with a human agent. In various embodiments, the user's identity is determined and associated user data is used for the selection of the persona. In various embodiments, the user data is obtained from a live video transmission of the user, which comprises human body, facial, language, gender, and apparel attribute data. Once the persona has been selected, a human agent is associated with the selected persona, followed by establishing a videoconference between the user and the human agent. The videoconference is then conducted, using persona data to transform the live video transmission of the human agent into a persona video transmission. In various embodiments, the persona video transmission of the human agent is displayed within a videoconference transformation system user interface (UI) implemented on a computing device.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

Figure 1:
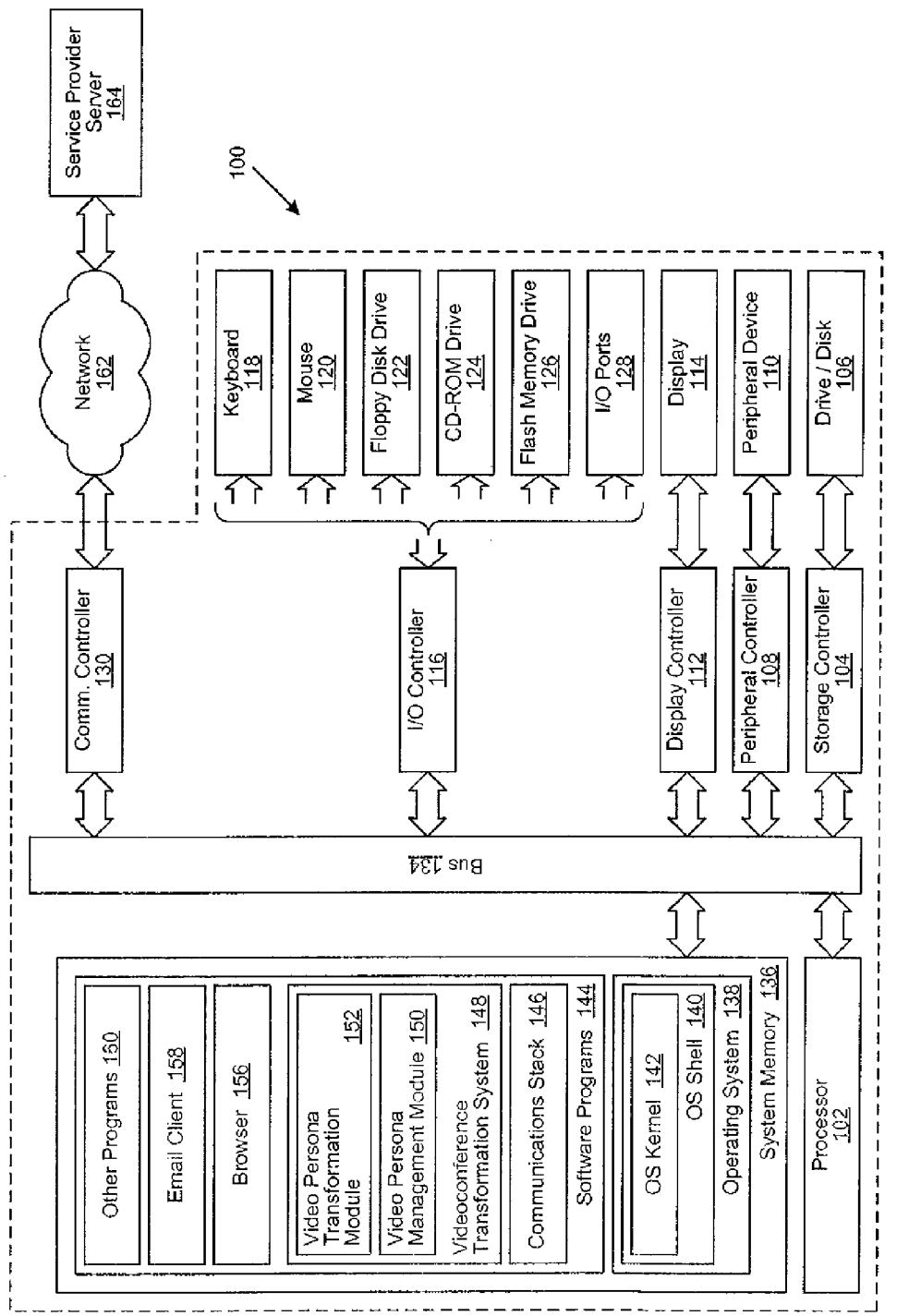
FIG. 1 depicts an exemplary client information processing system (IPS) in which embodiments of the disclosure may be implemented.

A method, system and computer-usable medium are disclosed for masking the identity of a human agent by transforming a live video transmission into a persona video transmission. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, wireless, radio frequency (RE), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a videoconference transformation system 148. The videoconference transformation system 148 includes computer executable instructions for implementing the processes described in FIGS. 2-6 described hereinbelow. In various embodiments, the videoconference transformation system comprises a video persona management module 148 and a video persona transformation module 152. In one embodiment, client IPS 100 is able to download the computer executable instructions of the videoconference transformation system 148 from a service provider server 164 located at a remote location. In another embodiment, the computer executable instructions of the videoconference transformation system 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
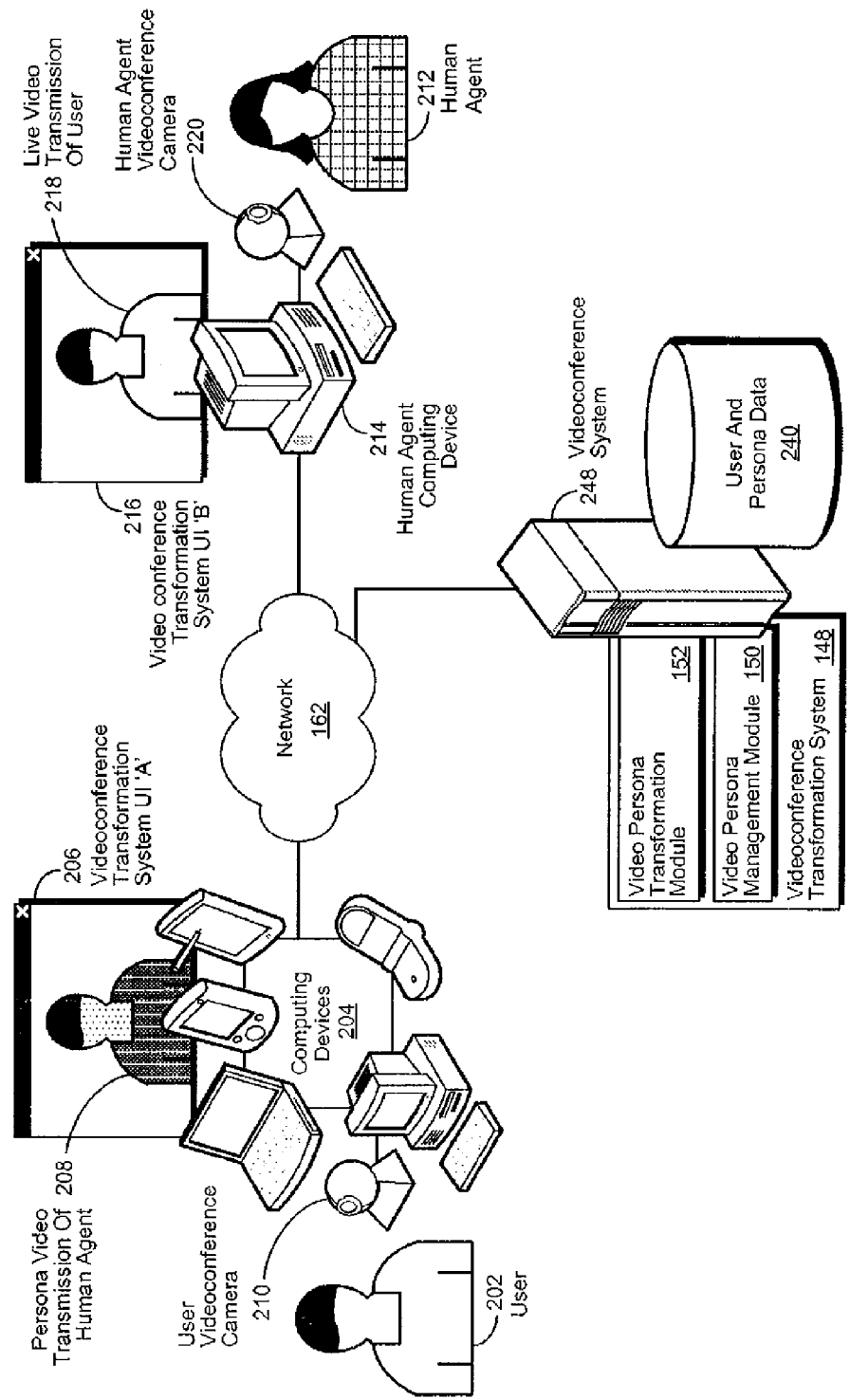
FIG. 2 is a simplified block diagram of a videoconference transformation system as implemented in an embodiment of the disclosure.

FIG. 2 is a simplified block diagram of a videoconference transformation system as implemented in and embodiment of the disclosure. In various embodiments, a videoconference transformation system 148 is implemented with a video conference system 248 for the transformation of live video transmissions into persona video transmissions. In these and other embodiments, the videoconference system 248 comprises a repository of user and persona data 240, and the videoconference transformation system 148 comprises a video persona management module 150 and a video persona transformation module 152.

As used herein, a persona broadly refers to a social role or an appearance that masks the actual identity of an individual, such as a human agent 212. As likewise used herein, a persona video transmission refers to the result of using data related to a persona to transform a live video transmission of an individual into a digital or analog representation of the individual. In various embodiments, the persona video transmission, such as the persona video transmission 208 of the human agent 212, is displayed within a user interface (UI) 'A' 206 of the video transformation system implemented on computing devices 204. As used herein, computing devices 204 may comprise a personal computer, a laptop computer, or a tablet computer operable to establish an on-line session with the videoconference transformation system 148 over a connection to network 162. The computing device 204 may also comprise a personal digital assistant (PDA), a mobile telephone, or any other suitable device operable to display the user interface (UI) 'A' 206 of the video transformation system and likewise operable to establish a connection with network 162.

In various embodiments, the persona video transmission is correlated, based on the data related to the persona, to the live video transmission. As an example, if the human agent 212 raises their hand, the persona represented in the persona video transmission of the human agent 208 likewise raises their hand. As another example, if the human agent 212 smiles, the persona represented in the persona video transmission of the human agent 208 likewise smiles. In these and other embodiments, the data related to a persona comprises human body, facial, language, gender, and apparel attribute data.

In this embodiment, a request is received from a user 202 for a videoconference with a human agent 202, which is then selected by the videoconference transformation system 148. In various embodiments, the selection of the human agent 212 may be based on a variety of factors. As an example, the user 202 may have had a prior videoconference with a specific human agent 212, and for continuity, the same human agent 212 is selected. As another example, the user 202 may need a human agent 212 with specific product or service knowledge. It will be appreciated by those of skill in the art that many such selection factors are possible and the foregoing is not intended to limit the spirit, scope, or intent of the disclosure.

Once a human agent 212 is selected for the videoconference, a determination is made whether to use user data to select a persona for video transformation. If not, then a default persona is selected. Otherwise, a subsequent determination is made whether to use user data stored in the repository of user and persona data 240. If so, the user's identity is determined and associated user data is retrieved from the repository of user and persona data 240. Otherwise a determination is made in block 318 whether to use user data obtained from the live video transmission of the user 202. If so, then the user's live video transmission is processed by the video persona management module 150 to obtain user data. In various embodiments, the user data obtained from the live video transmission of the user 202 comprises human body, facial, language, gender, and apparel attribute data. Skilled practitioners of the art will be knowledgeable of known approaches for obtaining such user data from a live video transmission. As an example, the user's 202 gender may be determined, as well as their preferred language (e.g., English, Spanish, etc.) and accent (e.g., Southern, New England, Irish, etc.). As another example, analysis of their body language and facial expressions may indicate their current emotional attitude (e.g., happy, agitated, concerned, etc.). Many such determinations and indications are possible and the foregoing is not intended to limit the spirit, scope, or intent of the disclosure. The user data is then further processed by the video persona management module 150 to select a persona for video transformation. As an example, the persona may be selected based on the subject of the videoconference (e.g., auto insurance claim, software technical support, sales inquiry, etc.). As another example, the persona may be selected to match facial and language attributes of the user (e.g., Hispanic facial attributes, Spanish language attributes, etc.).

Once the persona has been selected, the human agent 202 is associated with the selected persona, followed by establishing a videoconference between the user 202 and the human agent 212. In various embodiments, a user videoconference camera 210 is coupled to computing devices 204 to provide a live video transmission of the user 202 to the videoconference system 248. Conversely, a human agent videoconference camera 220 is coupled to a human agent computing device 214 to provide a live video transmission of the human agent 212 to the videoconference system 248. In various embodiments, a videoconference camera may be integrated into the computing devices 204 or the human agent computing device 214. The videoconference is then conducted, using the persona data described in greater detail herein, to transform the live video transmission of the human agent 212 into a persona video transmission, using approaches known to skilled practitioners of the art. As an example, the persona video transmission may comprise a speech-synchronized, animated avatar generated in part by a three dimensional biomechanical motion analysis of the live video transmission of the human agent. As another example, the persona video transmission may comprise cartooning, pixelizing, or morphing the live video transmission of the human agent into an animated or less detailed depiction. This approach keeps the person-to-person aspect of video communication intact, while removing or transforming distinctive human body, facial, and apparel features. Those of skill in the art will be knowledgeable of many such approaches and the foregoing is not intended to limit the spirit, scope, or intent of the disclosure. In various embodiments, the live video transmission of the user 218 is displayed within the videoconference transformation system UI 'B' 216 implemented on the human agent computing device 214. Likewise, the persona video transmission of the human agent 208 is displayed within the videoconference transformation system UI 'A' 206 implemented on computing devices 204.

Figure 3A:
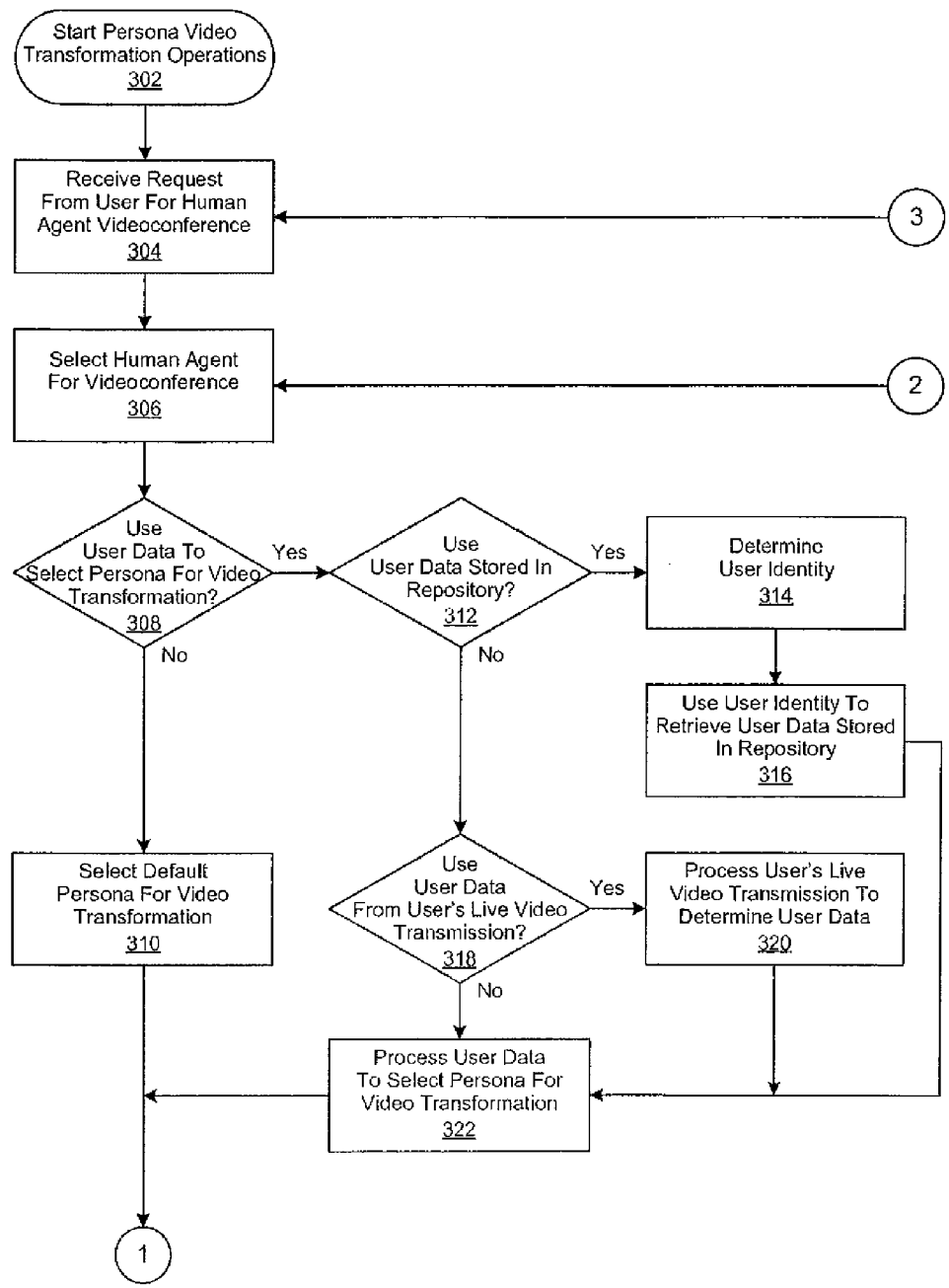
FIGS. 3a-b are a generalized flowchart of the operation of a videoconference transformation system as implemented in an embodiment of the disclosure.
Figure 3B:
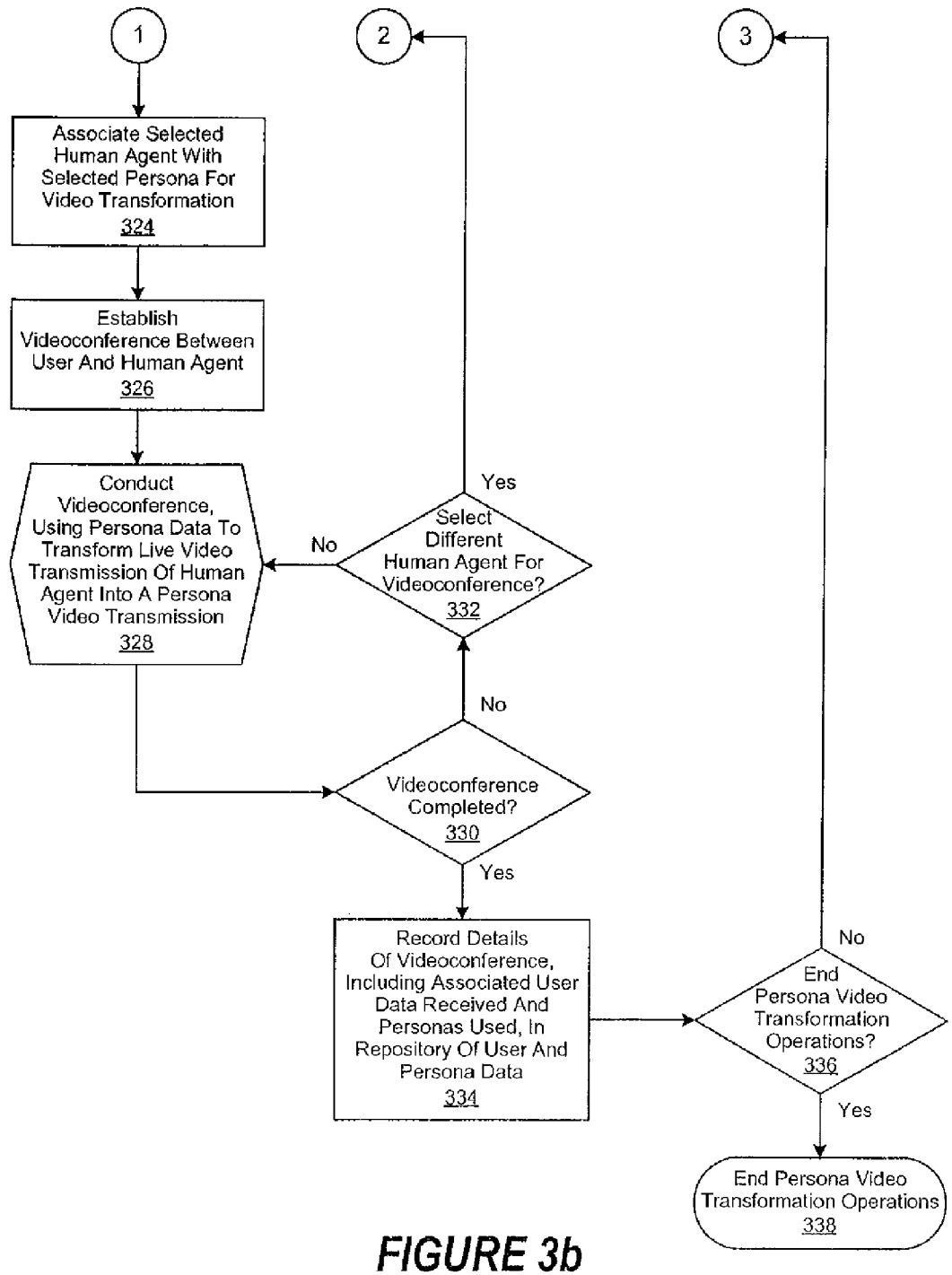

FIGS. 3a-b are a generalized flowchart of the operation of a videoconference transformation system as implemented in and embodiment of the disclosure. In this embodiment, persona video transformation operations are begun in block 302, followed by receiving a request from a user in block 304 for a videoconference with a human agent. In block 306, a human agent is selected for the videoconference.

Once a human agent is selected for the videoconference, a determination is made in block 308 whether to use user data to select a persona for video transformation. If not, then a default persona is selected in block 310 for the videoconference. Otherwise, a determination is made in block 312 whether to use user data stored in a repository of user and persona data. If so, the user's identity is determined in block 314 and associated user data is retrieved from the repository of user and persona data in block 316. Otherwise a determination is made in block 318 whether to use user data obtained from the live video transmission of the user. If so, then the user's live video transmission is processed in block 320 to obtain user data. However, if it is determined in block 318 not to use user data obtained from the live video transmission of the user, or once the user data has been respectively retrieved in block 316 or determined in block 320, then it is processed in block 322 to select a persona for video transformation.

Once the persona has been selected in block 310 or block 322, the human agent selected in block 306 is associated with the selected persona, followed by establishing a videoconference between the user and the human agent in block 326. The videoconference is then conducted in block 328, using the persona data described in greater detail herein, to transform the live video transmission of the human agent into a persona video transmission, likewise described in greater detail herein. A determination is then made in block 330 whether the videoconference is completed. If not, then a determination is made in block 332 whether to select another human agent for the videoconference. If not, then the process is continued, proceeding with block 328. Otherwise, the process is continued, proceeding with block 306. As an example, the user may request a videoconference with the human agent's manager. However, if it is determined in block 330 that the videoconference is completed, then the details of the videoconference, including associated user data received and personas used, are recorded in the repository of user and persona data in block 334. A determination is then made in block 336 whether to end persona video transformation operations. If not, then the process is continued, proceeding with block 304. Otherwise, persona video transformation operations are ended in block 338.

Figure 4:
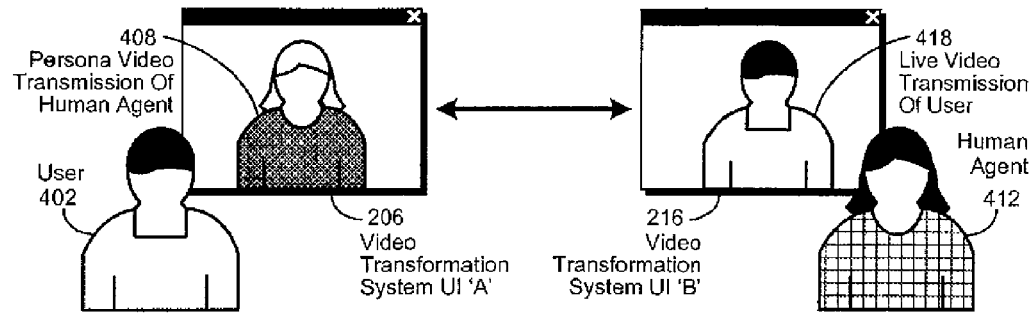
FIG. 4 is a simplified block diagram of a videoconference transformation system as implemented in an embodiment of the disclosure for transforming appearance attributes of a human agent during a persona video transmission.

FIG. 4 is a simplified block diagram of a videoconference transformation system as implemented in and embodiment of the disclosure for transforming appearance attributes of a human agent during a persona video transmission. In this embodiment, a videoconference is established between a user 402 and a human agent 412. Once established, a live video transmission of the user 418 is displayed within a user interface (UI) 'B' 216 of the video transformation system as described in greater detail herein. As likewise described in greater detail herein, persona data is used to transform the live video transmission of the human agent 412 into a persona video transmission of the human agent 408, which is then displayed within a UI 'A' 206 of the video transformation system.

In various embodiments, the persona video transmission is correlated, based on the data related to the persona, to the live video transmission. As an example, if the human agent 412 raises their hand, the persona represented in the persona video transmission of the human agent 408 raises their hand. As another example, if the human agent 412 smiles, the persona represented in the persona video transmission of the human agent 408 likewise smiles. In these and other embodiments, the data related to a persona comprises human body, facial, language, gender, and apparel attribute data.

As illustrated in FIG. 4, the human body and apparel attribute data associated with the human agent 412 has been used to transform the live video transmission of the human agent 412 into a persona video transmission of the human agent 408. More specifically, the human body attributes for the human agent's 412 hair has been transformed from 'brunette' to 'blond.' Likewise, the human apparel attributes for the human agent's 412 blouse has been transformed from 'plaid' to 'solid.' It will be apparent to skilled practitioners of the art that many such transformations are possible, and the foregoing is not intended to limit the spirit, scope, or intent of the disclosure.

Figure 5:
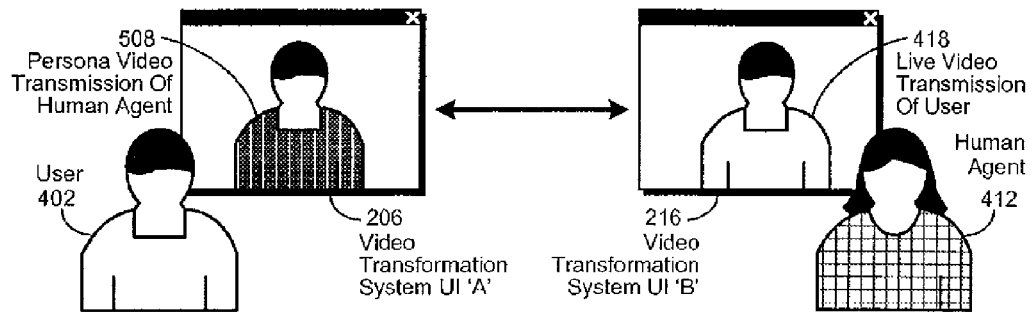
FIG. 5 is a simplified block diagram of a videoconference transformation system as implemented in an embodiment of the disclosure for transforming gender and appearance attributes of a human agent during a persona video transmission.

FIG. 5 is a simplified block diagram of a videoconference transformation system as implemented in and embodiment of the disclosure for transforming gender and appearance attributes of a human agent during a persona video transmission. In this embodiment, a videoconference is established between a user 402 and a human agent 412. Once established, a live video transmission of the user 418 is displayed within a user interface (UI) 'B' 216 of the video transformation system as described in greater detail herein. As likewise described in greater detail herein, persona data is used to transform the live video transmission of the human agent 412 into a persona video transmission of the human agent 508, which is then displayed within a UI 'A' 206 of the video transformation system.

As illustrated in FIG. 5, the human gender and apparel attribute data associated with the human agent 412 has been used to transform the live video transmission of the human agent 412 into a persona video transmission of the human agent 508. More specifically, the human gender attributes for the human agent 412 has been transformed from 'male to 'female'. Likewise, the human apparel attributes for the human agent's 412 blouse has been transformed from 'plaid' to a shirt that is 'solid.' Likewise, the language attributes of the human agent's 412 voice have been transformed from 'female' to 'male.' It will be apparent to skilled practitioners of the art that many such transformations are possible, and the foregoing is not intended to limit the spirit, scope, or intent of the disclosure.

Figure 6:
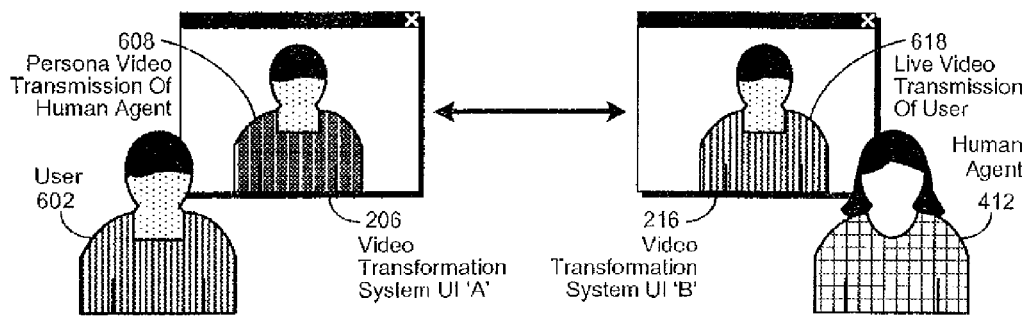
FIG. 6 is a simplified block diagram of a videoconference transformation system as implemented in an embodiment of the disclosure for using user data to select a persona for transforming gender and appearance attributes of a human agent during a persona video transmission.

FIG. 6 is a simplified block diagram of a videoconference transformation system as implemented in and embodiment of the disclosure for using user data to select a persona for transforming gender and appearance attributes of a human agent during a persona video transmission. In this embodiment, a videoconference is established between a user 602 and a human agent 412. Once established, a live video transmission of the user 618 is displayed within a user interface (UI) 'B' 216 of the video transformation system as described in greater detail herein. As likewise described in greater detail herein, the user's live video transmission 618 is processed to obtain user data. In various embodiments, the user data obtained from the live video transmission of the user 618 comprises human body, facial, language, gender, and apparel attribute data. Skilled practitioners of the art will be knowledgeable of known approaches for obtaining such user data from a live video transmission. As an example, the user's 602 gender may be determined, as well as their preferred language (e.g., English, Spanish, etc.) and accent (e.g., Southern, New England, Irish, etc.). As another example, analysis of their body language and facial expressions may indicate their current emotional attitude (e.g., happy, agitated, concerned, etc.). Many such determinations and indications are possible and the foregoing is not intended to limit the spirit, scope, or intent of the disclosure. The user data is then further processed to select a persona for video transformation. As an example, the persona may be selected based on the subject of the videoconference (e.g., auto insurance claim, software technical support, sales inquiry, etc.). As another example, the persona may be selected to match facial and language attributes of the user (e.g., Hispanic facial attributes, Spanish language attributes, etc.).

As illustrated in FIG. 6, the user data obtained from the live video transmission of the user 618 is used with persona data to transform the live video transmission of the human agent 412 into a persona video transmission of the human agent 608, which is then displayed within a UI 'A' 206 of the video transformation system. As likewise illustrated in FIG. 6, the human gender and apparel attribute data associated with the human agent 412 has been used to transform the live video transmission of the human agent 412 into a persona video transmission of the human agent 608. More specifically, the human gender attributes for the human agent 412 hair has been transformed from 'male to 'female.' Likewise, the human apparel attributes for the human agent's 412 blouse has been transformed from 'plaid' to a shirt that is 'pinstripe' to mirror the 'pinstripe' shirt of the user 602. Likewise, the language attributes of the human agent's 412 voice have been transformed from 'female' to 'male.' It will be apparent to skilled practitioners of the art that many such transformations are possible, and the foregoing is not intended to limit the spirit, scope, or intent of the disclosure.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Further-more, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A non-transitory computer-readable storage medium having computer-executable instructions stored thereon and executable by a processor to:
    send a request from a user for videoconference with an agent;
    establish the videoconference between the user and the agent; and
    receive a persona video transmission, wherein a live video transmission of the agent is transformed into the persona video transmission that provides that the agent is anonymous to the user;
    wherein the persona video transmission includes a persona selected to match a language attribute of the user.

2. A non-transitory computer-readable storage medium as set forth in claim 1 wherein the persona video transmission includes a persona that has been utilized in a previous videoconference between the user and the agent.

3. A non-transitory computer-readable storage medium as set forth in claim 1 having computer-executable instructions stored thereon and executable by a processor to display the person video transmission to the user within the videoconference, wherein a live video transmission of the user is displayed to the agent within the videoconference.

* * * * *